United States Patent

Douglas

[15] 3,647,475
[45] Mar. 7, 1972

[54] CLOUD FORTIFIED CITRUS FRUIT JUICES

[72] Inventor: Peter L. Douglas, Glendora, Calif.
[73] Assignee: Brown International Corporation, Whittier, Calif.
[22] Filed: Aug. 6, 1969
[21] Appl. No.: 850,326

Related U.S. Application Data

[63] Continuation of Ser. No. 496,970, Oct. 18, 1965, abandoned.

[52] U.S. Cl. .................................................99/105, 99/11
[51] Int. Cl. .........................................................A23l 1/02
[58] Field of Search..................99/100, 105, 205, 28, 78, 11, 99/103, 106

[56] References Cited

UNITED STATES PATENTS

| | | | |
|---|---|---|---|
| 1,848,760 | 3/1932 | Willison | 99/105 |
| 2,935,407 | 5/1960 | Haman | 99/105 |
| 3,404,990 | 10/1968 | Villadsen | 99/78 |

*Primary Examiner*—Norman Yudkoff
*Assistant Examiner*—Martin G. Mullen
*Attorney*—Paul A. Weilein

[57] ABSTRACT

A cloud fortified citrus fruit juice product is prepared by incorporating into an extracted citrus fruit juice a quantity of finely divided albedo, or inner white layer of the rind or peel of the citrus fruit, from which the outer flavedo layer containing the oil has been removed.

13 Claims, 1 Drawing Figure

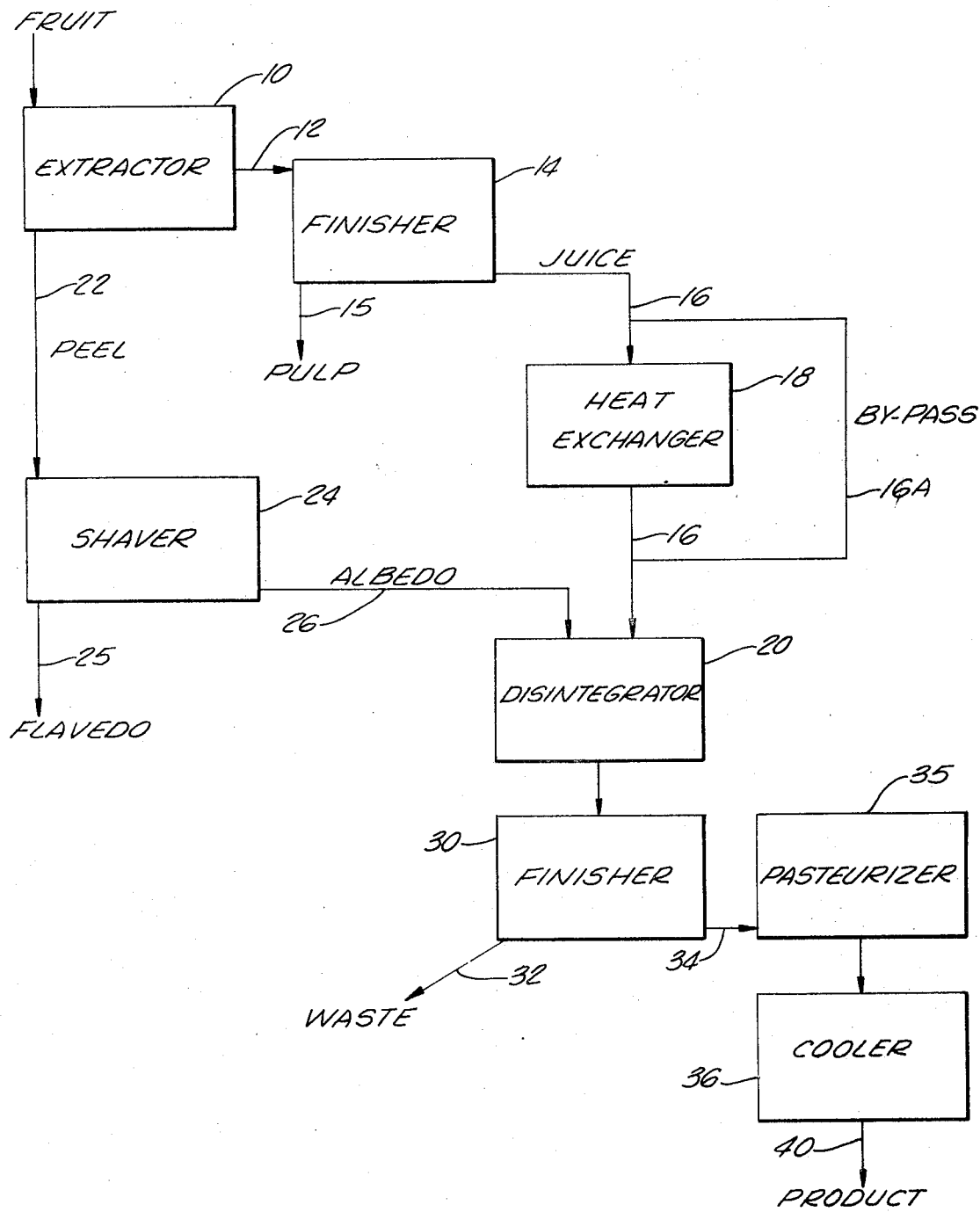

CLOUD FORTIFIED CITRUS FRUIT JUICES

This is a continuation of Ser. No. 496,970, filed on Oct. 18, 1965, now abandoned.

This invention relates to extracted citrus fruit juices, and more especially to the cloud fortification of citrus juices, particularly lemon juice, but the invention is by no means limited to lemon juices because it is also applicable to orange juice, grapefruit juice, lime juice, and tangerine juice of all varieties.

All the extracted citrus juices contain what is known as cloud which is a natural stable turbidity maintained in syspension by action of pectous (or pectinous) substances naturally occuring in the fruit. This cloud is deemed by many to impart much of the flavor of fresh juice as well as desirable appearance. It is largely in the form of colloidal materials and fine or microscopic particles of pulp. Not only is this cloud desired by consumers, but it is also deemed desirable by distributors who prefer as much stable cloud as reasonably possible.

It is therefore an object of this invention to provide a process and a product of citrus juice wherein the cloud is noticeably fortified well beyond the natural cloud of normal extracted citrus juices including lemon juice.

It is further an object of the invention to provide a cloud fortified juice wherein the cloud added is stable.

An important feature of the invention resides in incorporating into an extracted normal or single strength juice, such as lemon juice, a quantity of the albedo, or inner white layer of the rind or peel, in finely divided form (which is here termed "comminuted" form) and which is retained in stable suspension like the original cloud. This added albedo fraction contains pectin and pectous substances, like other portions of the fruit, and creates colloidal conditions maintaining the fine comminuted particles in stable suspension. Not only is the cloud in the resultant juice improved by the fortification, but the vitamin C content is increased. This is true of all the citrus fruits.

Other objects and features of the invention will become apparent to those skilled in the art upon consideration of the following specification and accompanying flowsheet, wherein there is disclosed what presently is considered the best manner of practicing the invention.

The flowsheet outlines a specific procedure, which, however, is typical, and, while indicative of preferred operations for lemon juice fortification, also represents preferred operations for handling the other citrus fruits as above mentioned.

DEFINITIONS

By the term "comminuted" as used herein is meant a fine state of subdivision, of the albedo especially, as mechanically produced in the presence of the juice to yield a colloidal type of condition insuring stable suspension in the liquid and to maintain the desired increased cloud effect. Such conditions are well known and these particle sizes are deemed to be microscopic. The comminution is accomplished by appropriate maceration and disintegration apparatus, including fine separation screens or the like, such as crushing, chopping, grinding and other suitable disintegrating equipment for handling portions of the albedo contained in the original citrus fruit from which the single strength or normal juice, in which the added albedo is macerated, was derived. "Normal" or "single strength" juice, as the terms are here used, signifies the citrus juice which is initially extracted from the fruit, such as lemons, by customary juice extraction processes for that fruit. These "initial juices" may then be cloud fortified as here, or concentrated, or reconstituted or blended in usual manners, as herein indicated or otherwise as desired. "Stable", as the term is here used in connection with cloud, refers to the characteristic of citrus fruit when properly prepared to hold its cloud constituents without settling to leave supernatant clear layers for long periods of time such as well established in the trade, e.g., 21 days.

As indicated in the flowsheet, a quantity of the selected fruit, such as 2,000 parts by weight, of lemons, is extracted at room temperature in any standard or preferred juice extraction apparatus 10, from which the extracted or initial or single strength juice is passes as by a pipeline 12 to an apparatus 14 known as a finisher (or the like). This apparatus may be a well known paddle finisher, or a screw-type finisher (such as a Chrisholm-Ryder finisher) or other finisher as desired. The finisher 14, which also usually operates at room temperatures, performs the function of separating or straining out the coarse solids in the form of pulp or "rag" from the desired juice. Typically 2,000 parts by weight of fruit yields about 1,000 parts by weight of juice mixture that is passed to the finisher 14 which in turn separates about 100 parts by weight of rag or pulp that is discarded by any removing means 15. The resultant 900 parts by weight of desired finished juice is then withdrawn, as by a line 16. Optionally, the line 16 may include a heat exchanger 18 for either warming or cooling the juice as may be desired.

The line 16 then feeds the juice to a mechanical comminutor, macerator or disintegrator or other appropriate apparatus 20, such as heretofore indicated, for incorporating finely divided or "comminuted" albedo into the juice in whatever proportion desired.

As illustrated, the peel from the extractor 10 is passed by a conveying means 22 to a standard or other preferred shaver or other separator 24 by which the inner albedo layer is removed from the outer flavedo layer containing the oil. The flavedo layer, which in the example given, may be about 400 parts by weight, is passed from the shaver 24 by any means 25 for oil recovery or other disposition. The shaved albedo, which may constitute about 600 parts by weight in the example, is then passed by a conveyor 26 to the disintegrator 20.

Thus, in this particular example, the disintegrator 20 works upon a mixture of about 60 percent of juice (900 parts by weight) and about 40 percent of shaved albedo (600 parts by weight). This apparatus may include grinding means, or chopping means, or any other form of disintegrating or macerating means that will yield a desired quantity of sufficiently finely divided or "comminuted" albedo distributed in the juice in colloidal or suspended form maintaining stability.

To maintain the required stable suspension, the resultant finely divided particles shall have particle sizes which are here considered colloidal in character and microscopic in size.

The juice mixture, after required treatment in the disintegrator or comminutor apparatus 20 is passed through another finisher 30, desirably of the screw finisher type by which substantially all materials coarser than the indicated colloidal or microscopic particles are separated and removed for further use or waste by a takeoff 32. Oversize particles that might pass the finisher, and which would otherwise settle, would be removed by further filtering or centrifuging or other appropriate means.

The "finished" juice is then conducted, as by a pipeline 34, to a pasteurizer 35, and thence to a cooler 36, whence it is removed at 40 for packaging. Pasteurization is effected at the usual pasteurization temperatures around 190° to 200° F. for between about 15 seconds and about 2 minutes, before cooling, depending upon the kind of fruit. This treatment retards microbial activity and destroys pecticienzymes.

Disintegration temperatures are not critical. They may be around room temperatures, or as low as about 40° F. or up to as high as 160° F. For example, the heat exchanger 18 may be employed for achieving these temperatures when desired. Otherwise, it may be bypassed by a line 16A.

After the insoluble oversize solids have been screened from the juice in the finisher 30, the juice may contain only around 0.1 percent by weight, or less, of the comminuted albedo solids which are now in colloidal or microscopic form and were produced in the comminutor or disintegrator 20.

If the amount of suspended albedo is more than desired for a product, the fortified juice is then diluted to desired or required cloud level or albedo concentration with normal juice from another extraction, particularly with juice extracted concurrently from another batch of the same fruit to maintain the same characteristics. The amount of fortifying albedo produced in fortifying a batch of juice is readily determined with appropriate instruments, such as the well-known Klett colorimeter. Exemplary determinations are given in the following table of Klett readings:

| | | Klett Reading |
|---|---|---|
| A | Normal single strength lemon juice | 415 |
| | Fortified lemon juice base | |
| B | prepared with 30% albedo | 650 |
| C | prepared with 40% albedo | 750 |
| D | prepared with 50% albedo | 860 |
| | Fortified blend | |
| E | 75% of A plus 25% of B | 505 |
| F | 75% of A plus 25% of C | 552 |
| G | 75% of A plus 25% of D | 602 |

A lemon juice that gives a Klett reading of 475 or above is cloud-fortified lemon juice.

The use of Klett readings for cloud measurements is well understood and common.

Since cloud fortified juices show lower citric acid contents and higher solids contents than normal or single strength juices, it may be necessary to concentrate them more to reach the conventional acid contents, such as grams of acid per liter for lemon juice. Concentrates from cloud fortified juice are more viscous by reason of added pectinous material and lower acid content. However, reconstituted juices made from types above, yield flavors that are preferred by some consumers, and drinks that are otherwise equally satisfactory. Fortified citrus juices in accordance with this improvement are substantially equally as stable as normal juices or concentrations of normal juices. Blends and reconstituted juices of varying percentages show no significant loss of cloud in comparison with those involving normal juices; conventional tests are used for these purposes. Blends, mixtures and concentrates are pasteurized or stabilized as above described for the cloud fortified product. Of course, pasteurized fortified juice bases may be added to previously pasteurized juices without further pasteurizing.

Respecting the amount of albedo added to the disintegration apparatus 20, this may vary widely. Besides the 40 percent of the example, 30 percent and 50 percent have been used. More, as well as less, may be used to obtain cloud contents desired in resultant base products to be diluted for final products. Since ordinarily possibly only around 0.1 to 0.5 percent by weight of the added albedo is comminuted, the comminuted albedo in the base product is accordingly less. Upon dilution of a base product with normal or single strength juice to yield a commercial product, the comminuted albedo added is correspondingly further reduced, as in the case of dilution of 25 percent of base product with 75 percent of single strength juice. Thus, overall cloud increases may vary widely, depending upon the product, for example between 0.01 percent and 0.1 percent of the juice, or an even wider range.

I claim:

1. A citrus fruit juice product including a normal extracted citrus juice and a quantity of added comminuted albedo particles only substantially free of the flavedo, of microscopic size in stable suspension in said juice in amount between about 0.01 percent and about 0.1 percent and providing the product with a fortified cloud.

2. A juice product as in claim 1 wherein the added comminuted albedo particles are present in amounts to yield a Klett reading of about 860.

3. A juice product as in claim 1 wherein the juice is lemon juice.

4. A juice product as in claim 3 wherein the added albedo particles are of colloidal character and give a Klett reading above about 475.

5. A cloud fortified citrus juice base for addition to formal extracted citrus juice for fortifying the latter and containing added comminuted microscopic albedo only substantially free of the flavedo, distributed in the juice in stable suspension and amounting to between about 0.1 percent and about 0.5 percent by weight of the extracted juice.

6. A fortified juice of claim 5 combined with a quantity of normal extracted citrus juice derived from the same batch of citrus fruit as that from which the fortified juice base is derived.

7. A method of preparing a fortified citrus fruit juice including the steps of:
    extracting juice from the fruit to yield a normal single strength juice thereof;
    recovering a portion of the peel of such fruit, and removing from such peel only a portion of the albedo thereof to the substantial exclusion of the flavedo;
    adding such removed albedo to a quantity of the extracted juice;
    finely dividing such added albedo in the presence of such extracted juice to which it is added to yield in the juice a quantity of such added albedo divided to colloidal size to promote stable suspension thereof in such juice and increase the cloud in the original normal extracted juice;
    and removing any coarse albedo particles larger than colloidal size from the thus cloud fortified juice product.

8. A method as in claim 7 wherein the comminuted added albedo particles provide a colloidal suspension thereof and are present in amount between about 0.01 percent and about 0.5 percent by weight of the extracted juice.

9. A method as in claim 7 wherein division of the added albedo is continued until disintegration yields a comminuted albedo content giving a Klett reading of up to about 860.

10. A method as in claim 7 wherein the fortified juice is pasteurized.

11. A method as in claim 7 wherein the albedo removed from the peel is added to the extracted juice in the proportion of between about 5 percent and 50 percent by weight of the juice.

12. A method of producing a cloud fortified citrus juice including preparing a fortified juice as in claim 7 and blending such fortified juice with an unfortified normal citrus juice to yield a cloud fortified juice product.

13. A method as in claim 12 wherein the prepared fortified juice contains suspended colloidal albedo particles only, in the order of 0.01 to 0.5 percent by weight of the juice and the fortified juice product obtained by said blending contains a smaller proportion of such colloidal particle in amount to yield a Klett reading of at least about 475.

* * * * *